US006707952B1

(12) United States Patent
Tan et al.

(10) Patent No.: US 6,707,952 B1

(45) Date of Patent: Mar. 16, 2004

(54) METHOD FOR REMOVING RINGING ARTIFACTS FROM LOCATIONS NEAR DOMINANT EDGES OF AN IMAGE RECONSTRUCTED AFTER COMPRESSION

(75) Inventors: Yap Peng Tan, Singapore (SG); Wenjun Zeng, Vancouver, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 713 days.

(21) Appl. No.: 09/584,036

(22) Filed: May 30, 2000

(51) Int. Cl.[7] .................................................. G06K 9/40

(52) U.S. Cl. ....................... 382/268; 382/260; 382/269; 382/199

(58) Field of Search ................................ 382/268, 269, 382/266, 260, 263, 274, 275, 199, 200; 358/426.04, 426.01, 426.16; 345/611–615

(56) References Cited

U.S. PATENT DOCUMENTS

| | | | | |
|---|---|---|---|---|
| 4,527,229 A | | 7/1985 | Imamura et al. | 363/126 |
| 4,670,840 A | | 6/1987 | Freundlich | 364/414 |
| 4,939,576 A | | 7/1990 | Campbell | 358/166 |
| 5,307,264 A | | 4/1994 | Waggener et al. | 364/413 |
| 5,420,431 A | | 5/1995 | Nishiki | 250/370.09 |
| 5,670,894 A | | 9/1997 | Takaishi et al. | 326/27 |
| 5,745,542 A | | 4/1998 | Gordon et al. | 378/4 |
| 5,748,086 A | | 5/1998 | Bettine et al. | 340/572 |
| 5,779,636 A | | 7/1998 | Kanazawa | 600/410 |
| 5,819,035 A | | 10/1998 | Devaney et al. | 395/200.32 |
| 5,841,828 A | | 11/1998 | Gordon et al. | 378/4 |
| 5,877,813 A | | 3/1999 | Lee et al. | 348/402 |
| 5,883,983 A | | 3/1999 | Lee et al. | 382/268 |
| 5,974,197 A | | 10/1999 | Lee et al. | 382/268 |
| 6,148,115 A | * | 11/2000 | Mackinnon et al. | 382/266 |
| 6,151,420 A | * | 11/2000 | Wober et al. | 382/275 |
| 6,226,050 B1 | * | 5/2001 | Lee | 348/607 |
| 6,370,279 B1 | * | 4/2002 | Paik | 382/268 |

OTHER PUBLICATIONS

"Adaptive Postprocessor for Block Encoded Images," by Chung J. Kuo and Ruey J. Hsieh, IEEE Transactions on Circuits and Systems for Video Technology, vol. 5, No. 4, Aug. 1995; 1051–8215/95, © 1995 IEEE.

"A Postprocessing Method for Reducing Quantization Effects in Low Bit–Rate Moving Picture Coding," by Hyun Wook Park and Yung Lyul Lee, IEEE Transactions on Circuits and Systems for Video Technology, vol. 9, No. 1, Feb. 1999; 1051–8215/99 © 1999 IEEE.

* cited by examiner

*Primary Examiner*—Bhavesh M. Mehta
*Assistant Examiner*—Ali Bayat
(74) *Attorney, Agent, or Firm*—Marger Johnson & McCollom, PC

(57) ABSTRACT

A method to remove ringing artifacts from locations near dominant edges of an image reconstructed after compression. The image is decomposed into blocks small enough so that each would contain only one significant edge. A significant edge is tested as to whether it is a dominant edge of the image. If there is no dominant edge, the block is not processed. In the remaining blocks, the exact pixels that include the dominant edges are output without filtering. The direction of the dominant edges is inferred, and then the remaining pixels are filtered with a directional de-ringing filter. The de-ringing filter has a main direction that is aligned with the direction of the edge, and thus also with an inherent direction of the ringing artifacts.

13 Claims, 3 Drawing Sheets

METHOD FOR REMOVING RINGING ARTIFACTS FROM LOCATIONS NEAR DOMINANT EDGES OF AN IMAGE RECONSTRUCTED AFTER COMPRESSION

BACKGROUND OF THE INVENTION

1. Field of the Invention

The present invention is related to the field of digital image processing, and more specifically to filtering to remove ringing artifacts from decompressed images.

2. Description of the Related Art

Images are stored in arrays of pixels. Each pixel stores a small portion of an image, in the form of image data. The same is true for both static images (such as photographs), and for video sequences.

The large volume of image data slows down its transmission. To alleviate the problem, compression techniques are used to reduce the amount of data. Sometimes high compression is used for fastest transmission.

A problem arises when a high compression technique is used with insufficient bit rate of transmission. When the image is reconstructed, it includes visual noise, which is also called ringing artifacts. These artifacts are introduced in the places of the image where high spatial frequency DCT (Direct Cosine transform) components are substantially reduced. This occurs also around the dominant edges of the image.

The prior art has addressed this problem by applying a de-ringing filter, to remove the artifacts. This approach does not work satisfactorily. Either the artifacts are not removed fully, or the dominant edges are filtered too much. In that case, the dominant edges become so smoothened that they no longer appear as dominant, which detracts from the overall image quality.

BRIEF SUMMARY OF THE INVENTION

The present invention overcomes these problems and limitations of the prior art.

Generally, the present invention provides a method for removing ringing artifacts from locations near dominant edges of a reconstructed image. The invention exploits the fact that artifacts near dominant edges has a direction that can be inferred from a main direction of the dominant edge. The invention teaches to filter the image data on either side of the pixels containing the edge. Filtering is with a special directional de-ringing filter according to the invention, which means that the de-ringing filter has a main direction aligned with the edge direction.

It will be appreciated that the dominant edges of the image are therefore not smoothened, since they themselves are not filtered. In addition, the artifacts are eliminated through a single filtering pass, since the directional de-ringing filter of the invention is fundamentally aligned with their main direction.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides methods. The methods of the invention can be implemented by software.

Although only two methods are described, that is for illustration. Some of their steps overlap, and a method according to the invention can contain steps of both.

Figure 1:
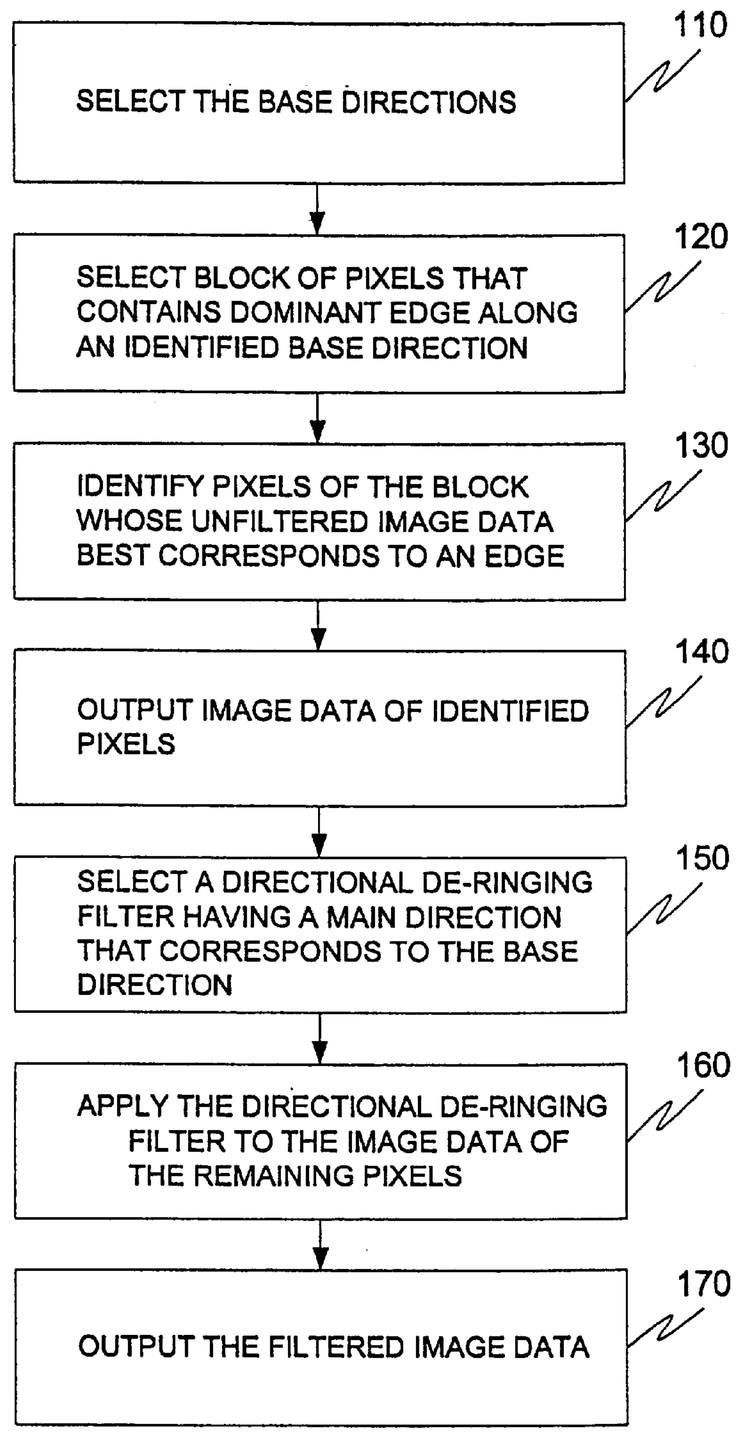
FIG. 1 is a flowchart illustrating a method according to the invention.

Referring now to FIG. 1, a first method of the invention is described. The method is for filtering image data corresponding to an image. The image data are stored in a plurality of pixels.

According to a box 110, base directions are defined for a plane. The base directions are chosen so that any direction belonging in a plane of the image can be described in terms of them. The preferred base directions are the horizontal and the vertical. Any direction in a plane of the image can be described in terms of a percentage of vertical and a percentage of horizontal.

In its most general form, the invention can be applied for only one of the base directions, which can be an identified, preset direction of interest. This will cover all dominant edges aligned with the preset direction. The method is preferably repeated with all the base directions, so as to cover all the possible directions of the dominant edges of the image.

The whole array of pixels is decomposed into blocks of pixels. The block size is chosen to be small enough to contain only one significant edge, and the associated ringing artifacts near it. A block size that works well is 8×8 pixels.

Each block is tested for containing a significant edge. If evidence of a significant edge is found, then the strongest edge is tested for being a dominant image edge. The testing for containing an edge includes using directional edge detection masks. A number of such masks are selected. Each mask has a mask direction associated with a respective one of the base directions. The masks are applied to at least some of the image data. This identifies at least one of the pixels that stores image data corresponding to an image edge, which is aligned with an identified one of the base directions. Since the base direction is known, the dominant edge direction is also known.

According to a box 120, a block of pixels is selected that contains a dominant edge along one of the base directions. Blocks that do not contain a dominant edge are inferred to not contain ringing artifacts and are preferably not processed.

According to a box 130, once a block has been identified, then at least one pixel of the block is identified whose unfiltered image data best corresponds to an edge. It is preferred to identify all the pixels of the block whose image data contains the dominant edge.

According to a box 140, even though unfiltered, the image data of the identified pixels is output. This will prevent smoothing of the dominant edge of the image. Once output, it is known that the remaining pixels contain image data that do not include the dominant edge.

According to a box 150, a directional de-ringing filter is selected. The filter is selected to have a main direction that corresponds to the identified base direction. This ensures that the filter's main direction is also inherently aligned with the direction of the dominant edge of the image.

The invention exploits the fact that ringing artifacts have an inherent alignment with the direction of the dominant edge of the image. The selected filter's main direction will turn out to be aligned with the inherent alignment of the ringing artifacts.

According to a box 160, the selected filter is applied to the image data of at least another one of the pixels. It is preferred to apply it to all the pixels remaining after the operation of box 140.

According to a box 170, the filtered image data is also output.

Figure 2:
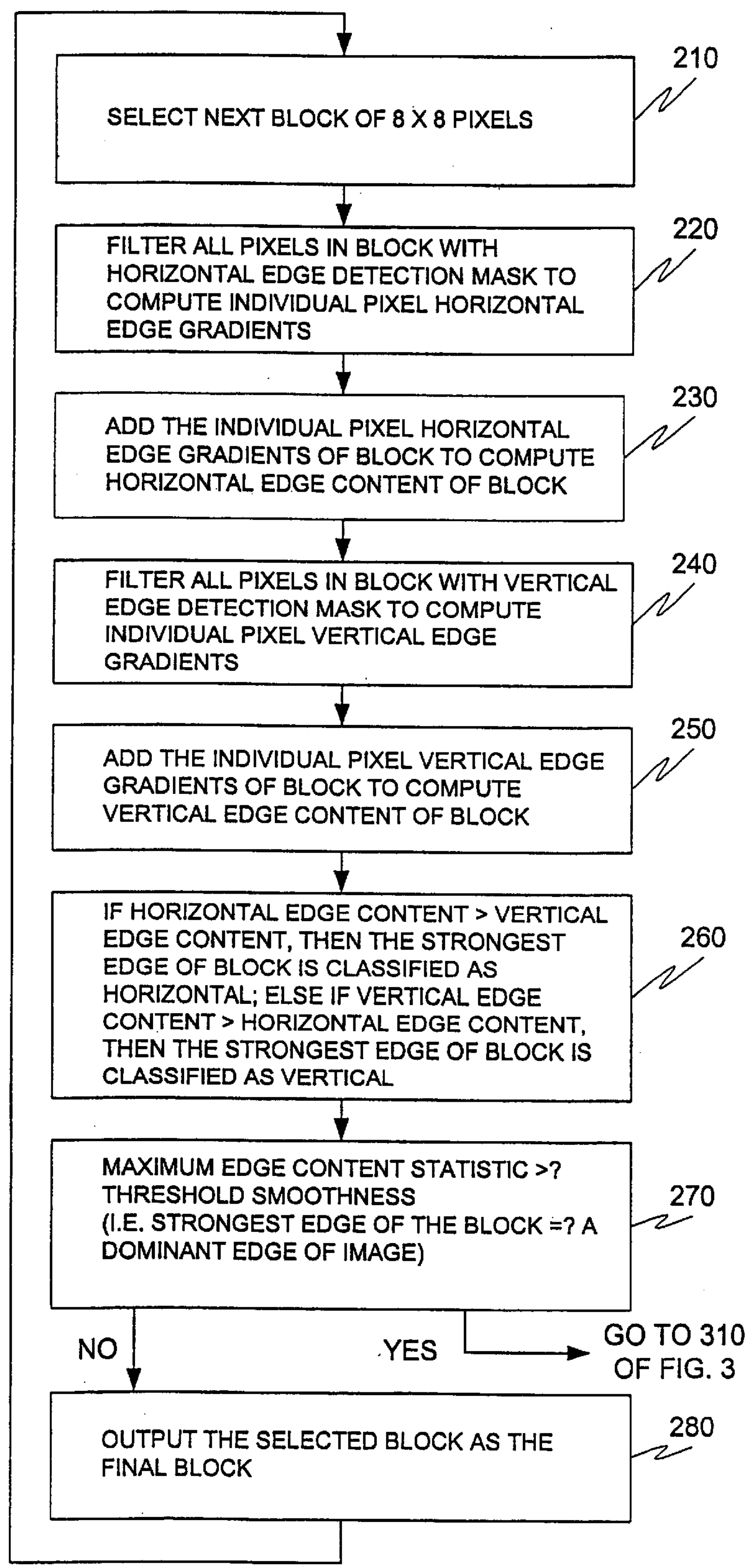
FIG. 2 is a first portion of a flowchart illustrating another method according to the invention.
Figure 3:
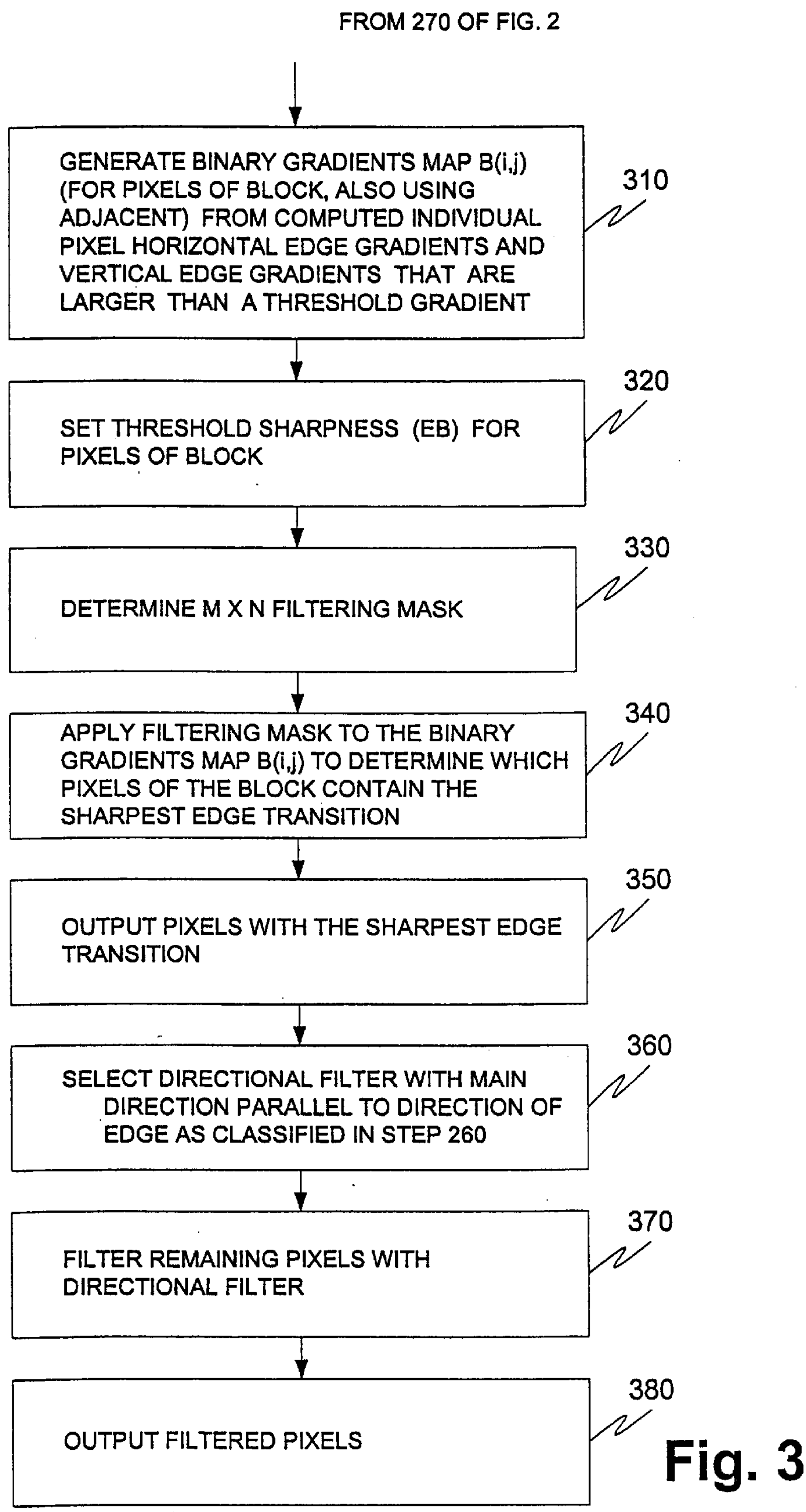
FIG. 3 is a second portion of the flowchart of FIG. 2.

Referring now to FIGS. 2 and 3, a second method of the invention is described. It is a method for generating filtered image data that correspond to an image, from respective unfiltered image data which are stored in a plurality of respective pixels. The second method resembles the first method in a number of ways. For example, it will be recognized that boxes 210 through 260 can correspond to box 120 of FIG. 1.

According to a box 210, the next block of pixels is chosen. If this is the beginning of the process, then the first block of pixels is chosen.

The processing that follows is for the image data of the pixels of the selected block.

According to a box 220, the image data of at least some of the pixels are filtered, which is also known as convolved, with a horizontal edge detection mask $E_H$. A suitable horizontal edge detection mask $E_H$ is given by Equation (1):

$$E_H=[-1\ 0\ 1] \qquad \text{Equation (1)}$$

Preferably all the pixels of the block are so filtered. This will compute a horizontal edge gradient $G_H(i,j)$ for each pixel of the block.

According to a box 230, the absolute values of the individual pixel horizontal edge gradients $G_H(i,j)$ are summed. The sum, also known as the horizontal edge content of a horizontal edge $C_{HB}$ in the block, is given by Equation (2):

$$C_{HB} = \sum_{i,j} |G_H(i,j)| \qquad \text{Equation (2)}$$

According to boxes 240 and 250, the same computation is made for the vertical content. More specifically, the image data of at least some of the pixels are filtered, which is also known as convolved, with a vertical edge detection mask $E_V$. A suitable vertical edge detection mask $E_V$ is given by Equation (3):

$$E_V = \begin{bmatrix} -1 \\ 0 \\ 1 \end{bmatrix} \qquad \text{Equation (3)}$$

Preferably all the pixels of the block are filtered according to this method. This will compute a vertical edge gradient $G_V(i,j)$ for each pixel of the block.

According to a box 250, the absolute values of the individual pixel vertical edge gradients $G_V(i,j)$ are summed. The sum, also known as the vertical edge content of a vertical edge $C_{VB}$ in the block, is given by Equation (4):

$$C_{VB} = \sum_{i,j} |G_V(i,j)| \qquad \text{Equation (4)}$$

According to a box 260, the horizontal edge content of the block $C_{HB}$ is compared to the vertical edge content $C_{VB}$ of the block. If $C_{HB}$ is larger than $C_{VB}$, then the portion of the image of the image data contained in pixels of the block is classified as containing a horizontal edge. Conversely, if $C_{VB}$ is larger than $C_{HB}$, then the portion of the image is classified as containing a vertical edge.

Optionally and preferably, a maximum edge content statistic MC is determined. MC is preferably determined as per Equation (5).

$$MC = \max_{i,j}\{|G_H(i,j)|,\ |G_V(i,j)|\} \qquad \text{Equation (5)}$$

According to a box 270, the maximum edge content statistic MC is compared to a preset smoothness threshold $S_T$. This is equivalent to inquiring whether the strongest edge of the block is a dominant edge of the image. If not, the according to box 280, the selected block is output as the final block. If yes, then processing continues as per the box 310.

According to a next box 310, a binary gradients map B(i,j) is generated, according to equation (6).

$$B(i,j) = \begin{cases} 1 & \text{if } \max\lfloor G_H(i,j), G_V(i,j)\rfloor > Thr_{EDGE} \\ 0 & \text{otherwise} \end{cases} \qquad \text{Equation (6)}$$

The binary gradients map B(i,j) is for pixels of the block. Computation of some of the values requires using the image data of pixels adjacent to the block. It will be appreciated that each pixel is classified as more horizontal or more vertical, and also larger than a threshold gradient $G_T$. As such, the threshold gradient $G_T$ is different from the threshold smoothness $S_T$ defined above.

Similarly to box 130 of FIG. 1, this method also identifies pixels of the block whose image data best correspond to the edge. By this time, it is known that there exists some edge along one of the base directions, and that it is a dominant edge of the image.

Referring to box 320, a threshold sharpness EB is set for each of the pixels of the block, as quantified by the binary gradients map B(i,j).

According to box 330, a filtering mask M×N is determined. Preferably N>=M works better. The larger the M, the more smooth the filtering results. Filtering masks with sizes 3×7, 3×5, 1×7, 1×5, and 3×3 work well. In general, the smaller the image, the smaller the size of the filtering mask should be, so as not to lose the image details.

According to box 340, the filtering mask M×N is applied to the binary gradients map B(i,j) to determine which pixels of the block contained the sharpest edge transition. This is best implemented by using Equation (7).

$$\sum_{\substack{i-\lfloor M/2\rfloor \le r \le i+\lfloor M/2\rfloor \\ j-\lfloor N/2\rfloor \le s \le j+\lfloor N/2\rfloor}} B(r,s) > E_B \qquad \text{Equation (7)}$$

Each pixel which satisfies Equation (7) is deemed to have another sharp edge transition. The threshold EB is set low enough so that at least one pixel satisfies Equation (7), and high enough so that at least another one pixel does not.

According to box 350, the pixels that satisfy equation 6 are output without further processing. The remaining pixels are deemed to be non-edge pixels in the block, and to contain the associated ringing artifacts.

According to box 360, a directional filter is selected. The selected filter has a main direction parallel to the direction of the edge, as classified by the operation of box 270. If the dominant edge direction has transitions along the horizontal direction, then the directional filter $L_{DRH}$ is used. Use of the filter is by operation of Equation (8) below:

$$L_{DRH}(i,j) = \underset{\substack{i-\lfloor M/2\rfloor \le r \\ r \le i+\lfloor M/2\rfloor}}{mean}\left[\underset{\substack{j-\lfloor N/2\rfloor \le s \\ s \le j+\lfloor N/2\rfloor}}{median}\{L(r,s)\}\right] \qquad \text{Equation (8)}$$

On the other hand, if the dominant edge direction has transitions along the vertical direction, then the directional filter $L_{DRV}$ is used. Use of the filter is by operation of Equation (9) below:

$$L_{DRV}(i,j) = \underset{\substack{i-\lfloor M/2\rfloor \le s \\ s \le i+\lfloor M/2\rfloor}}{mean}\left[\underset{\substack{j-\lfloor N/2\rfloor \le r \\ r \le j+\lfloor N/2\rfloor}}{median}\{L(r,s)\}\right] \qquad \text{Equation (9)}$$

According to box 370, the image data of the remaining pixels are filtered by the directional filter. According to box 380, the filtered image data is output.

It will be appreciated that, due to the nature of the filter, the invention results in a different mean value for each side of the edge. This phenomenon makes the edge appear a more natural part of the reconstructed image.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A method for filtering image data corresponding to an image that are stored in a plurality of pixels, comprising:

defining a plurality of base directions in terms of which any direction belonging in a plane of the image can be described;

computing edge content in each of the base directions and comparing the edge contents of each direction to each other;

identifying a first one of the pixels that stores image data corresponding to an image edge aligned with an identified one of the base directions;

selecting a directional de-ringing filter having at least one main filter direction associated with the identified base direction; and applying the selected directional de-ringing filter to the image data of at least a second one of the pixels.

2. The method of claim 1, further comprising:

selecting a plurality of directional edge detection masks, each having a mask direction associated with a respective one of the base directions, and applying the masks to at least some of the image data to identify the first pixel.

3. The method of claim 1, further comprising:

determining a maximum edge content statistic; and comparing the determined maximum edge content statistic to a threshold smoothness.

4. A method for filtering image data corresponding to an image that are stored in a plurality of pixels, comprising:

identifying a first one of the pixels that stores image data corresponding to an image edge that has a preset edge direction;

computing edge content in the preset edge direction and comparing the edge content of the preset direction to edge content of at least one other direction;

selecting a directional de-ringing filter having at least one main filter direction associated with the preset edge direction; and applying the selected directional de-ringing filter to the image data of at least a second one of the pixels.

5. The method of claim 4 further comprising:

selecting a directional edge detection mask having a mask direction associated with the preset direction, and applying the mask to at least some of the image data to identify the first pixel.

6. The method of claim 4 further comprising:

identifying a third one of the pixels that stores image data that does not correspond to an image edge that has the preset edge direction, and applying the selected directional de-ringing filter to the image data of the third pixel.

7. A method for generating filtered image data corresponding to an image from respective unfiltered image data stored in a plurality of respective pixels, the method comprising:

selecting a group of pixels;

selecting a first edge detection mask having a first mask direction;

computing edge content in the first mask direction and comparing the edge content of the first mask direction to edge content of at least one other direction;

convolving the image data of at least some of the selected pixels with the first edge detection mask to detect in a portion of the image corresponding to the group a first edge having a component along the first mask direction; and if an edge is thus detected, applying to at least one of the selected pixels a directional de-ringing filter having a main direction associated with the first mask direction.

8. The method of claim 7, further comprising:

selecting a second edge detection mask having a second mask direction perpendicular to the first mask direction;

convolving the image data of at least some of the selected pixels with the second edge detection mask to detect in a portion of the image corresponding to the group a second edge having a component along the second mask direction; and if such a second edge is detected, applying to at least one of the selected pixels a directional de-ringing filter having a main direction associated with the second mask direction.

9. A method for generating filtered image data corresponding to an image from respective unfiltered image data stored in a plurality of respective pixels, the method comprising:

selecting a block of pixels;

convolving the image data of at least some of the selected pixels with a horizontal edge detection mask to measure a horizontal edge content of a horizontal edge in a portion of the image corresponding to the block;

convolving the image data of at least some of the selected pixels with a vertical edge detection mask to measure a vertical edge content of a vertical edge in a portion of the image corresponding to the block;

comparing the horizontal edge content to the vertical edge content;

classifying the portion of the image as containing a horizontal edge if the horizontal edge content is larger than the vertical edge content, else classifying the portion of the image as a vertical edge, if the vertical edge content is larger than the horizontal edge content; and if the portion of the image is classified as a containing a horizontal edge, applying a directional de-ringing filter having a horizontal main direction to at least a first one of the selected pixels, else if the portion of the image is classified as a containing a vertical edge, applying a directional de-ringing filter having a vertical main direction to at least a second one of the pixels in the block.

10. The method of claim 9, further comprising:

determining a maximum edge content statistic, and wherein the directional de-ringing filter is applied only if the determined maximum edge content statistic is larger than a preset smoothness threshold.

11. A method for generating filtered image data corresponding to an image from respective unfiltered image data stored in a plurality of respective pixels, the method comprising:

identifying a block of pixels containing image data corresponding to an edge having an edge direction;

computing edge content in the edge direction and comparing the edge content of the edge direction to edge content of at least one other direction;

identifying one of the pixels whose unfiltered image data of a pixel, and outputting the unfiltered image data of the pixel as the respective filtered image data;

selecting a directional de-ringing filter having a main direction that corresponds to the edge direction; and applying the selected directional de-ringing filter to the image data of at least another one of the pixels to generate respective filtered image data.

12. The method of claim 11, further comprising:

determining whether the image data of a pixel corresponds to an edge sharper than a preset threshold.

13. The method of claim 11, further comprising:

identifying at least one direction of interest;

selecting a directional edge detection mask having a main direction associated with the direction of interest; and applying the directional mask to at least some of the image data to identify pixels that store image data corresponding to an image edge having an edge direction parallel to the direction of interest.

* * * * *

UNITED STATES PATENT AND TRADEMARK OFFICE
CERTIFICATE OF CORRECTION

PATENT NO. : 6,707,952 B1
DATED : March 16, 2004
INVENTOR(S) : Tan et al.

It is certified that error appears in the above-identified patent and that said Letters Patent is hereby corrected as shown below:

Column 6,
Lines 21 and 26, "claim 4 further" should read -- claim 4, further --.

Signed and Sealed this

Twenty-first Day of September, 2004

JON W. DUDAS
*Director of the United States Patent and Trademark Office*